(12) United States Patent
Höhne et al.

(10) Patent No.: US 11,606,700 B2
(45) Date of Patent: Mar. 14, 2023

(54) SPATIAL REUSE FOR WIRELESS COMMUNICATIONS

(71) Applicant: Nokia Technologies Oy, Espoo (FI)

(72) Inventors: Thomas Höhne, Helsinki (FI); Olli Alanen, Vantaa (FI); Mika Kasslin, Espoo (FI); Jari Mustajärvi, Espoo (FI); Janne Tervonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 108 days.

(21) Appl. No.: 16/777,186

(22) Filed: Jan. 30, 2020

(65) Prior Publication Data
US 2020/0296592 A1 Sep. 17, 2020

(30) Foreign Application Priority Data

Mar. 15, 2019 (EP) ..................................... 19163063

(51) Int. Cl.
*H04W 16/14* (2009.01)
*H04B 7/06* (2006.01)
*H04W 16/28* (2009.01)

(52) U.S. Cl.
CPC .......... *H04W 16/14* (2013.01); *H04B 7/0617* (2013.01); *H04B 7/0626* (2013.01); *H04W 16/28* (2013.01)

(58) Field of Classification Search
CPC .... H04W 16/14; H04W 16/28; H04B 7/0617; H04B 7/0626; H04B 7/0619; H04B 7/0456
See application file for complete search history.

(56) References Cited

U.S. PATENT DOCUMENTS

| | | | |
|---|---|---|---|
| 2015/0030094 A1* | 1/2015 | Zhang | H04B 7/0626 375/267 |
| 2016/0295630 A1 | 10/2016 | Gubeskys et al. | |
| 2018/0241443 A1* | 8/2018 | Khidre | H04B 1/0475 |
| 2019/0075581 A1* | 3/2019 | Salem | H04W 74/006 |
| 2020/0112350 A1* | 4/2020 | Yang | H04B 7/088 |
| 2020/0146066 A1* | 5/2020 | Nguyen | H04W 4/40 |

(Continued)

OTHER PUBLICATIONS

Office action received for corresponding European Patent Application No. 19163063.1, dated Apr. 13, 2021, 7 pages of office action.

(Continued)

*Primary Examiner* — Justin T Van Roie
(74) *Attorney, Agent, or Firm* — Harrington & Smith

(57) ABSTRACT

According to an example aspect of the present invention, there is provided a method, comprising: transmitting, by a first transceiver of a first radio technology, wherein a first device comprises the first transceiver, a calibration start message to a second device, transmitting a calibration message by a second transceiver of a second radio technology, wherein the first device comprises the second transceiver, receiving channel state information, by the first transceiver from the second device, wherein the channel state information is based on reception of the calibration message, determining at least one coefficient for null steering towards the second device based on the channel state information, and transmitting a directional message to a third device, using the at least one coefficient.

20 Claims, 9 Drawing Sheets

(56) References Cited

U.S. PATENT DOCUMENTS

2021/0058967 A1* 2/2021 Oteri ................ H04W 74/0808

OTHER PUBLICATIONS

Extended European Search Report received for corresponding European Patent Application No. 19163063.1, dated Aug. 9, 2019, 8 pages.
Yin et al., "Spatial Resource Allocation for Spectrum Reuse in Unlicensed LTE Systems", IEEE Global Communications Conference (GLOBECOM), Dec. 4-8, 2017, 6 pages.

* cited by examiner

SPATIAL REUSE FOR WIRELESS COMMUNICATIONS

FIELD

Various example embodiments relate to wireless communications, and in particular to spatial reuse mechanisms for overlapping wireless networks having different radio access technologies.

BACKGROUND

Channel utilization is based on a single carrier frequency in many wireless networks, such as wireless local area networks. In case of shared channels, users tune on the same channel and try to transmit data. To avoid collisions, several techniques exist, such as the carrier sense multiple access (CSMA).

Spatial reuse enables to improve network capacity, and algorithms have been studied and proposed for enabling spatial reuse. Directional antennas may be applied for mitigating co-channel interference. In beamforming, phases of the antennas are aligned such that they add up constructively, to provide gain of the signal in a desired direction. In null-steering the phases are aligned to decrease interference caused to devices in other directions. With the increasing number of wireless devices and networks, there are more overlapping networks, and transmissions causing interference to neighbouring networks. In unlicensed access different networks and different radio access technologies (RATs) may share the channel. There is a demand to further develop and improve technologies facilitating spatial reuse.

SUMMARY

Some aspects of the invention are defined by the features of the independent claims. Some specific embodiments are defined in the dependent claims.

According to a first aspect of the present invention, there is provided a method, comprising: transmitting, by a first transceiver of a first radio technology, wherein a first device comprises the first transceiver, a calibration start message to a second device, transmitting a calibration message by a second transceiver of a second radio technology, wherein the first device comprises the second transceiver, receiving channel state information, by the first transceiver from the second device, wherein the channel state information is based on reception of the calibration message, determining at least one coefficient for null steering towards the second device based on the channel state information, and transmitting a directional message to a third device, using the at least one coefficient.

According to a second aspect of the present invention, there is provided a method, comprising: receiving, by a first transceiver of a first radio technology, wherein a first device comprises the first transceiver, a calibration start message from a second device, receiving, by the second transceiver of a second radio technology, wherein the first device comprises the second transceiver, a calibration message from the second device, generating channel state information on the basis of the received calibration message, and transmitting, by the first transceiver, the channel state information to the second device for beamforming and/or null steering by the second device.

There is also provided an apparatus comprising at least one processor, at least one memory including computer program code, the at least one memory and the computer program code being configured to, with the at least one processor, cause the apparatus at least to carry out features in accordance with the first and/or second aspect, or any embodiment thereof.

There is further provided an apparatus, comprising means configured for causing the apparatus at least to carry out features in accordance with the first and/or second aspect, or any embodiment thereof. The means may comprise at least one processor, and at least one memory including computer program code, the at least one memory and the computer program code being configured to, with the at least one processor, cause the performance of the apparatus.

According to still further aspects, there are provided a computer program and a computer-readable medium, or a non-transitory computer-readable medium, configured, when executed in a data processing apparatus, to carry out features in accordance with the first and/or second aspect, or an embodiment thereof.

In an embodiment according to the first aspect, the null-steering is performed by the second transceiver.

In an embodiment according to the first aspect, transmission time for the calibration message is determined based on the reception time of the calibration start acknowledgement or response message or on the transmission of the calibration start message.

In an embodiment according to the first aspect, a calibration start acknowledgement or calibration response message is received by the first transceiver from the second device, and the calibration message is transmitted by the second transceiver in response to the calibration start acknowledgement or response message.

In an embodiment according to the first aspect, the first transceiver of the first apparatus receives a preceding calibration message from the second device before transmitting the calibration message to the second device.

In an embodiment according to the second aspect, the calibration message is received by the first transceiver, the second transceiver is informed of the timing information and further signal parameters on the basis of the calibration message received by the first transceiver, and the second transceiver is controlled to receive the calibration message on the basis of the timing information and further signal parameters from the first transceiver.

In an embodiment according to the second aspect, a preceding calibration message is transmitted, before said received calibration message by the second transceiver, from the first device to the second device by the first transceiver or the second transceiver. The second transceiver may be informed of transmission time of the preceding calibration message, and the preceding calibration message may be transmitted by the second transceiver on the transmission time.

In some embodiments, the channel state information from the second device is interpolated for subcarrier spacing of the second radio technology by the first device.

According to a still further aspect, and in some embodiments of the first aspect, the first device transmits, by the first transceiver, interpolation control information to the second device. The second device controls, on the basis of the interpolation control information, interpolation for a channel estimate generated on the basis of the received calibration message (sent by the second transmitter of the second RAT and received by a transceiver of the first RAT). The second device transmits the interpolated channel estimate as the channel state information to the first device. The interpolation control information may comprise one or more of an interpolation request, indication of length of the calibration signal, and indication of subcarrier resolution for reporting the channel state information to the first device, for example. In some embodiments, the first transceiver is a wireless local area network transceiver and the second transceiver is a fifth generation new radio-unlicensed transceiver. The first device may be configured to operate as a gNodeB and a wireless local area network access point and the second device is a wireless local area network station.

According to a still further aspect, there is also provided an apparatus, comprising a transceiver of a first radio technology, wherein the transceiver is configured to receive a calibration message from a second transceiver of a second radio technology (e.g. operate as the second device of the first aspect receiving the calibration message from the second transceiver of the first device). The apparatus may be configured to interpolate a channel estimate generated on the basis of the received calibration message, and transmit the interpolated channel estimate as the channel state information to the first device. The apparatus may be configured to receive interpolation control information from the first device and control the interpolation on the basis of the interpolation control information.

EMBODIMENTS

Figure 1A:
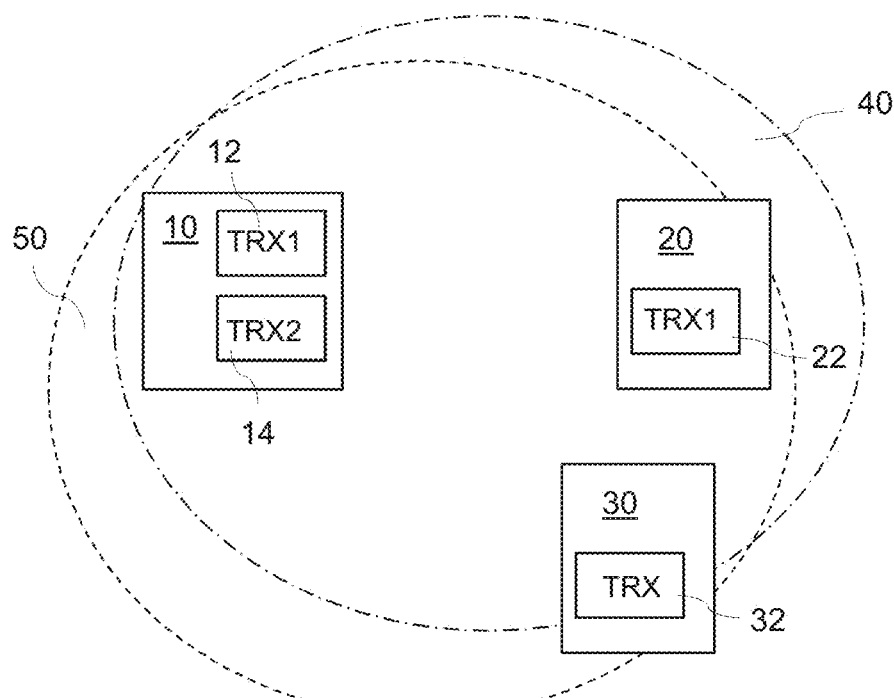
FIGS. 1a to 1c illustrate a wireless communication system and communication examples in accordance with at least some embodiments.

FIG. 1a illustrates a simplified wireless communication example, comprising device A 10, device B 20 and device C 30. Device A comprises a 1st transceiver (TRX1) 12 of a 1st radio technology and a 2nd transceiver (TRX2) 14 of a 2nd radio technology. Devices B 20 and C 30 comprise transceivers 22, 32, respectively. In some embodiments, at least the TRX1 22 is of the same 1st radio technology type as the TRX1 12 of device A.

In some embodiments, the TRX1 12, 22 is a wireless local area network (WLAN) transceiver, which may be configured to operate as a station (STA) in an IEEE 802.11-based WLAN. Thus, the STA may be associated with a basic service set (BSS) which is a basic building block of IEEE 802.11-based WLANs. The most common BSS type is an infrastructure BSS that includes a single access point (AP) together with all STAs associated with the AP. The device 10, 20 may be configured to operate as an AP or a non-AP STA. The AP may be a fixed AP or a mobile AP. The STA may provide access to other networks, such as the Internet. In an embodiment, the plurality of BSSs may interconnect to form an extended service set (ESS).

In WLANs the medium access control (MAC) layer communicates with the physical layer convergence protocol (PLCP) sublayer via primitives (a set of "instructive commands" or "fundamental instructions") through a service access point (SAP). When the MAC layer instructs it to do so, the PLCP prepares MAC protocol data units (MPDUs) for transmission. The PLCP minimizes the dependence of the MAC layer on the physical medium dependent (PMD) sublayer by mapping MPDUs into a frame format suitable for transmission by the PMD. The PLCP also delivers incoming frames from the wireless medium to the MAC layer. The PLCP appends a PHY-specific preamble and header fields to the MPDU that contain information needed by the physical layer transmitters and receivers. The 802.11 standard refers to this composite frame (the MPDU with an additional PLCP preamble and header) as a PLCP protocol data unit (PPDU).

Clear channel assessment (CCA) is applied for determining if WLAN medium is idle or not. The CCA includes carrier sense and energy detection functions, wherein carrier sense refers generally to ability of the receiver to detect and decode WLAN signal preamble. Network allocation vector (NAV) is a virtual carrier-sensing mechanism used in wireless network protocols, such as IEEE 802.11 based systems, and is a logical abstraction that limits the need for physical carrier-sensing at the air interface to save power. The MAC layer frame headers contain a duration field that specifies the transmission time required for the communication. In addition, the PLCP header also carries information relevant for determining the duration of the frame being transmitted. Wireless devices listening to the wireless medium read this information and back off accordingly.

There may be coexisting wireless communication networks, which may be of different RATs, illustrated by 40 and 50. For example, there may be a WLAN and a cellular network, such as a fifth generation (5G) new radio-unlicensed (NR-U) network, coexisting in the same unlicensed band. One or more of the devices 10, 20, 30 may be a multi-antenna device. One or more of the devices may be configured to utilize their spatial degrees of freedom for beamforming their transmitted signals and/or placing nulls towards coexisting devices.

Null steering enables to improve WLAN spatial reuse and facilitates simultaneous transmissions in overlapping basic service sets (OBSSs). Null steering requires channel state information (CSI) from the devices to which the nulls should be steered. In order to perform a steering, combined effect (phase and amplitude) of the channel as well as that by the transceiver hardware need to be known. The combined channel effect in some methods is measured using calibration signals and providing feedback on how the channel is seen by the remote device. In OFDMA the channel feedback will be measured per subcarrier, or group of subcarriers. A calibration, or sounding, frame exchange may be performed to obtain such channel information. The term sounding is applied below particularly in connection with WLAN based examples (using a sounding PPDU), and the calibration message may refer to a sounding frame or signal at least in some embodiments.

A beamformer utilizes the information of the MIMO channel to generate a steering matrix that improves reception in the beamformee. The beamforming steering matrix, computed (or updated) from a new channel measurement, replaces the existing matrix for the next beamformed data transmission. There are several methods of beamforming, differing in the way the beamformer acquires the knowledge of the channel matrices and on whether the beamformer generates or the beamformee provides feedback information for the beamformer to generate the steering matrix. In IEEE 802.11 based systems implicit feedback beamforming (fb bf) and explicit fb bf may be performed.

Implicit feedback beamforming is a technique that relies on reciprocity in the time division duplex channel to estimate the channel over which a device is transmitting based on the MIMO reference that is received from the device to which it plans to transmit. This technique allows the transmitting device to calculate a set of transmit steering matrices, one for each subcarrier, which are intended to optimize the performance of the link.

In implicit fb bf, a calibration procedure is carried out once, e.g. at association time, and the e.g. downlink (DL) transmitter will infer the channel from uplink (UL) preambles only later. In explicit fb bf, the DL transmitter will send a sounding signal and obtain from the device the measured channel estimate within the channel's coherence time.

There is now provided a solution facilitating inter-RAT based null steering and beamforming, to further enhance spatial reuse in case of overlapping networks having different RATs. Null steering between coexisting networks, such as Wi-Fi and NR-U networks, enables much more efficient spatial reuse mechanism than the default listen-before-talk scheme. However, channel estimation based on signals from other RAT is difficult. Transceivers are optimized for their own RATs and they may not or only poorly be able to receive or transmit a signal of another RAT. It is now proposed that channel calibration or sounding procedure is carried out co-operatively by transceivers of different RATs.

Figure 1B:
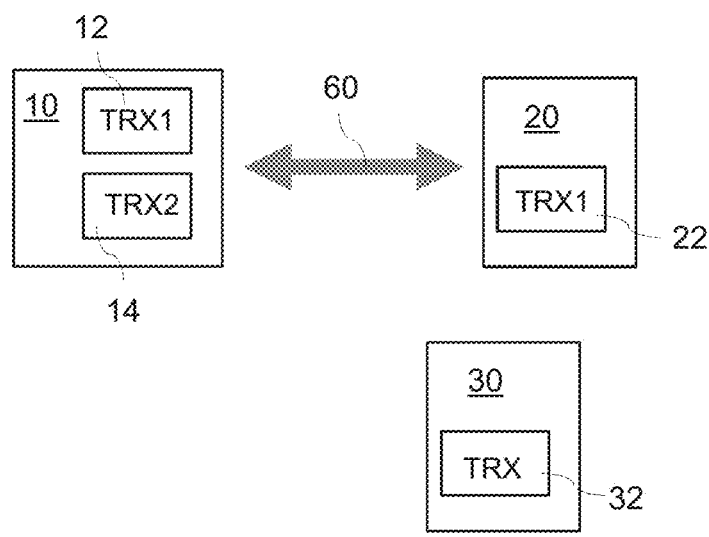

As illustrated in FIG. 1b, device A 10 may perform a calibration procedure 60 or message exchange with device B 20, utilizing both of its transceivers 12, 14 to obtain CSI from device B, for null steering and/or beamforming by the device A. In case the procedure is initiated by the device A 10, the calibration procedure 60 may be started by a calibration start message from the 1st transceiver 12. The 2nd transceiver 14 may be controlled to transmit a subsequent calibration message to the device B, or in some embodiments receive the calibration message from the device B 20, to obtain channel state information based on the calibration message by utilizing the other RAT. For example, the calibration procedure 60 may be initiated by the TRX1 12 configured to support WLAN and the calibration signal is transmitted by the TRX2 14 supporting NR-U or another cellular radio technology.

Figure 1C:
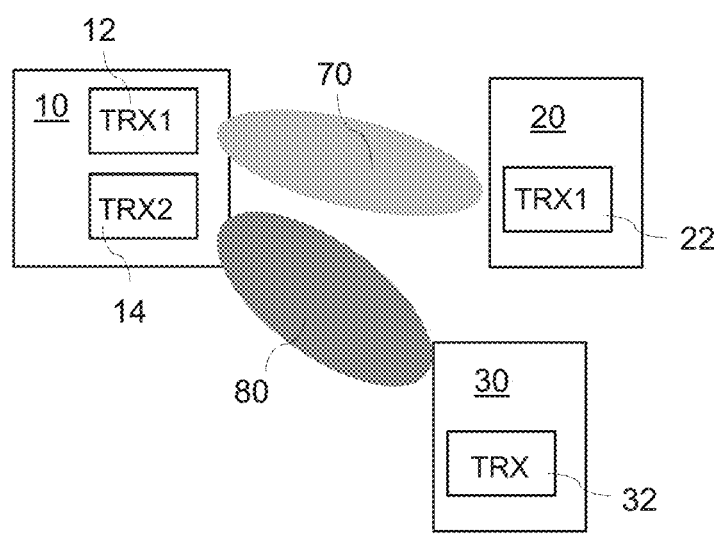

As further illustrated in FIG. 1c, in some embodiments the device A 10 may then perform null steering 70 towards the device B and directional transmission 80 to the further device C on the basis of the received CSI.

Figure 2:
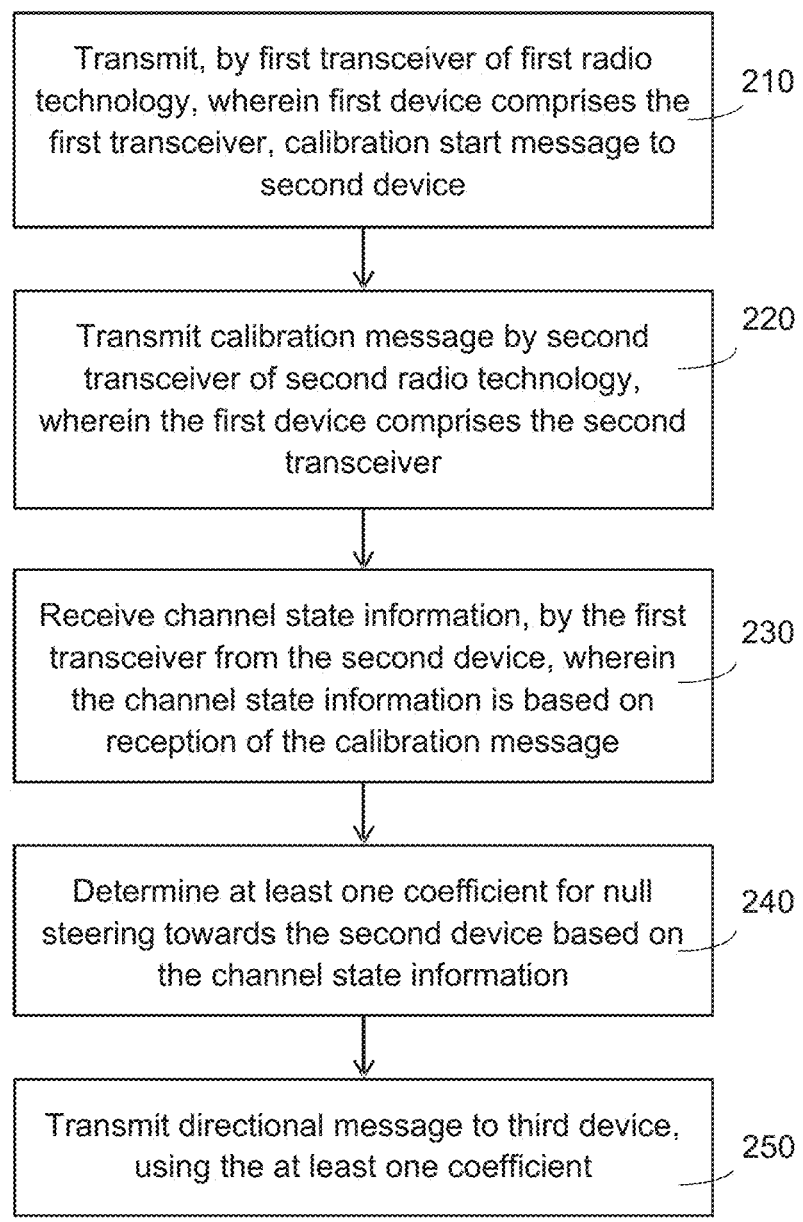
FIGS. 2 and 3 illustrate methods in accordance with at least some embodiments.

FIG. 2 illustrates a method for facilitating spatial reuse, particularly for application in case of overlapping networks having different RATs, and for multi-RAT calibration or sounding for beamforming and null steering. The method may be performed in or caused by a wireless communications apparatus or the 1st device, such as the device A 10 or a controller thereof. The method may be carried out by a beamformer device.

The method comprises transmitting 210, by a 1st transceiver of a 1st radio technology, a calibration start message to a 2nd device from a 1st device comprising the 1st transceiver. The calibration start message refers generally to any type of message of the 1st RAT capable for indicating or causing initiation of calibration or sounding operations. For example, in case of IEEE802.11-based RAT, very high throughput (VHT) or high-efficiency (HE) sounding protocol may be used. In an embodiment, the calibration start message is a null data packet (NDP) announcement frame or a calibration start frame. Block 210 may be entered and based on an input of an upper protocol layer for PDU transmission from AP1 to a $3^{rd}$ wireless device, such as the device C 30, for example. There may be predetermined condition(s) for activating enhanced spatial reuse and thus entering block 210.

A 2nd transceiver of a 2nd radio technology, the 1st device comprising the 2nd transceiver, transmits 220 a calibration message. For example, in case of IEEE802.11-based RAT, the calibration message may be a calibration sounding response or complete frame (of implicit fb or an NDP frame transmitted in response to the announcement frame (of explicit fb bf). A signal comprising the calibration message may comprise a predefined waveform in time, which is now transmitted by the 2nd transceiver of the 2nd RAT instead of the first transceiver of the 1st RAT.

It is to be noted that a transmission time for the calibration message may be determined as separate block between blocks 210 and 220. The 2nd transceiver then transmits 220 the calibration message on the determined transmission time. The transmission time may be provided for the 2nd transceiver by the 1st transceiver performing the calibration procedure handshaking or a device controller.

Channel state information is received 230 by the 1st transceiver from the 2nd device, wherein the channel state information is based on reception of the calibration message. At least one coefficient for null steering towards the 2nd device is determined 240 based on the channel state information. A directional message is transmitted 250 to a third device, using the at least one coefficient.

Figure 3:
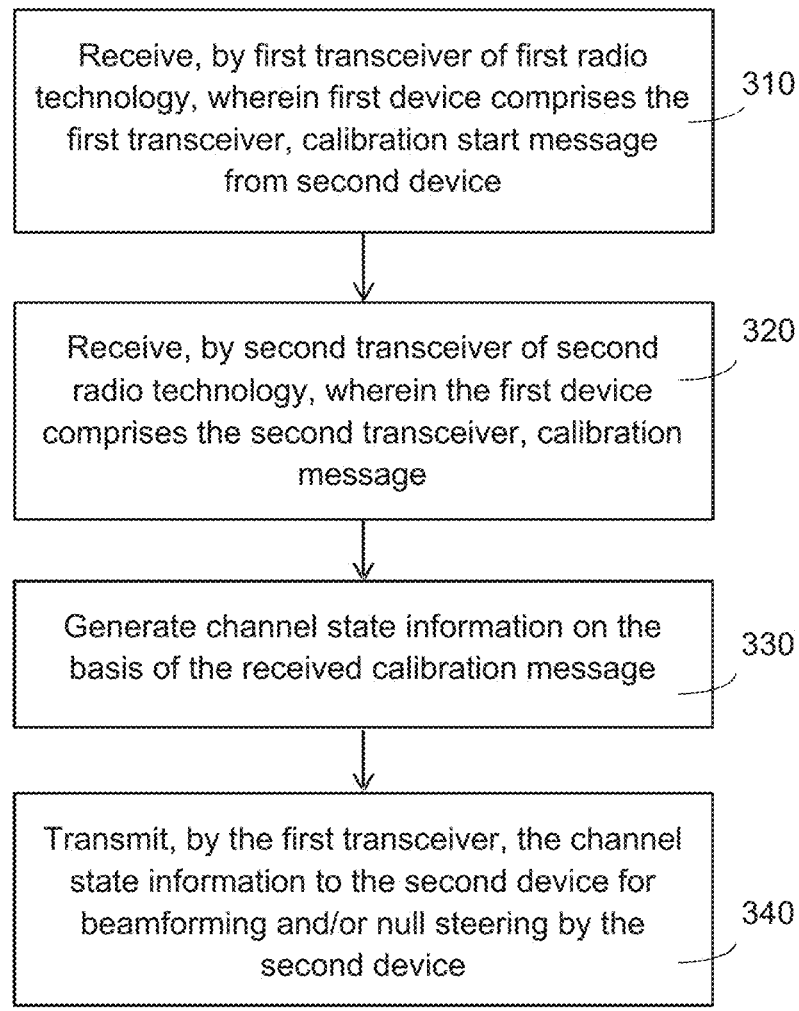

FIG. 3 illustrates a method for facilitating spatial reuse, particularly for application in case of overlapping networks having different RATs. The method may be performed in or caused by a wireless communications apparatus, or the 1st device, such as the device A 10 or a controller thereof. The method may be carried out by a beamformee device, some further examples being illustrated in connection with FIGS. 8 to 11.

Block 310 comprises receiving, by a 1st transceiver of a 1st radio technology, wherein a 1st device comprises the 1st transceiver, a calibration start message from a 2nd device. A 2nd transceiver of a 2nd radio technology, wherein the 1st device comprises the 2nd transceiver, receives 320 a calibration message from the 2nd device.

It is to be noted that timing information for the calibration message may be determined as a separate block between blocks 310 and 320. The 2nd transceiver then receives 320 the calibration message from the 2nd device on the basis of the determined timing information. The transmission timing information may be provided for the 2nd transceiver by the 1st transceiver or a device controller.

Channel state information is generated 330 on the basis of the received calibration message. The channel state information is transmitted 340 by the 1st transceiver to the 2nd device. The 2nd device may then use the received channel state information for beamforming and/or null steering.

Thus, in the example of FIGS. 1b and 1c, protocol handshakes may be carried out between the transceivers 12 and 22 by the 1st RAT, and the 2nd transceiver 14 only needs to transmit 220 and/or receive 320 the calibration signal.

This simplifies implementation and standardization, since the 2nd RAT TRX2 in the device 10 does not have to be configured to perform all 1st RAT physical and MAC layer processing (or vice versa).

In some embodiments, such as WLAN embodiments, instead of the term calibration, term sounding may be applied. The channel state information refers generally to feedback information generated on the basis of the calibration message, such as IEEE 802.11 explicit or implicit beamforming feedback to a sounding signal (PPDU).

In connection with the method of FIG. 2, the 2nd device, such as the device B 20, may comprise a (third) transceiver of the 1st RAT, configured to communicate with the 1st transceiver of the 1st device. The transceiver of the 2nd device receives the calibration start message and performs further actions in accordance with the applied calibration procedure. Furthermore, the transceiver of the 2nd device is configured to receive a calibration message transmitted 220 by the 2nd transceiver of the 2nd RAT. Thus, the 1st transceiver may be configured to bypass attempting synchronization, as in normal reception. The 1st transceiver may be configured further to bypass search for header(s) of the 1st RAT, such as a WLAN preamble. The 1st transceiver may be configured to sample the received signal at given time instants, on the basis of the calibration start message and generate the CSI on the basis of the samples. There may be also further control indication/information in the calibration signal and/or the calibration start message for controlling the 1st transceiver to appropriately receive and process the calibration message transmitted by the different RAT.

In some embodiments, a calibration start acknowledgement or calibration response message is transferred to the (1st transceiver of the) 1st device from the 2nd device in response to the calibration start message of 210/310. The calibration message may then be configured to be transmitted 220 by the 2nd transceiver in response to the calibration start acknowledgement or response message.

The transmission time for the calibration message may be determined based on the reception time of the calibration start acknowledgement or response message, or based on the transmission 210 of the calibration start message.

In some embodiments, the channel state information comprises subcarrier channel estimate information, channel quality information, or beamforming coefficient information. The calibration message may be generated on the basis of (or to comprise) a predetermined waveform or sequence. In some embodiments, the 2nd transceiver is configured to generate the calibration message using at least some of:
- a waveform provided by the 1st transceiver,
- a prestored sequence accessed by the 2nd transceiver, or
- a sequence generated by the 2nd transceiver on the basis of input parameters from the 1st transceiver or a device controller.

It is noted that the device (and the receiver thereof) receiving the calibration signal and generating the CSI, i.e. the 2nd device in the method of FIG. 2 or the 1st device in block 320 of the method of FIG. 3, is pre-informed of the form and contents of the calibration signal before reception, to be able to generate the channel estimate. This information, e.g. as in example embodiments in the previous paragraph, may be preconfigured in the 2nd transceiver, or in some embodiments indicated to the 2nd transceiver by the 1st transceiver or the device controller.

In some embodiments, null steering towards the 2nd device is performed by the 2nd transceiver on the basis of the coefficient(s) generated in block 240. In some embodiments, the 2nd transceiver is caused to transmit 250 the directional message on the basis of the coefficient(s) generated in block 240.

Different RATs usually have different sub-carrier spacing, affecting beamforming and null-steering. In some embodiments, the received channel state information is interpolated for subcarrier spacing for the 2nd transceiver, for directional transmission by the 2nd transceiver. The coefficient(s) may thus be generated on the basis of the interpolated channel state information, and may thus be provided for the 2nd transceiver for null steering.

Block 240 may thus comprise determining the coefficient(s) for subcarrier spacing (SCS) for the 2nd transceiver. Thus, the channel estimate/computed coefficient(s) (of the SCS of the 1st RAT/transceiver) may be interpolated to the SCS applied for the 2nd RAT/transceiver, such as the NR-U transceiver. The beamforming coefficients and CSI for a subcarrier are complex values. The interpolation may comprise magnitude and phase interpolation.

There may be further blocks in FIG. 2 of carrying out the CSI interpolation, providing coefficient(s) based on the interpolated CSI to the 2nd transceiver, and performing the null steering towards the 2nd device by the 2nd transceiver. In an alternative embodiment, the null-steering and/or beamforming is performed by the 1st transceiver.

In some embodiments, such as those applying the method of FIG. 3, the channel estimate based on the calibration message as received 320 by the 2nd transceiver is interpolated for the SCS applied for the 1st transceiver. The interpolated channel estimate may then be transmitted 340 by the 1st transceiver as the CSI.

It is to be appreciated that there may be multiple 2nd devices for which null-steering is performed and/or multiple third devices for which directional message(s) are transmitted.

In some embodiments, the 1st transceiver is configured to perform IEEE 802.11 based RAT and the 2nd transceiver is configured to perform NR-U RAT. Thus, an NR-U transmitter (tx) of the device A is configured to send a sounding signal that the Wi-Fi receiver (rx) of device B can decode. Some further example embodiments are below illustrated particularly for this configuration; however, it will be appreciated the at least some of the disclosed features may be applied also in other RAT interworking configurations.

Example Embodiments for Beamformer Device

Implicit Feedback Sounding Procedure Example

Figure 4:
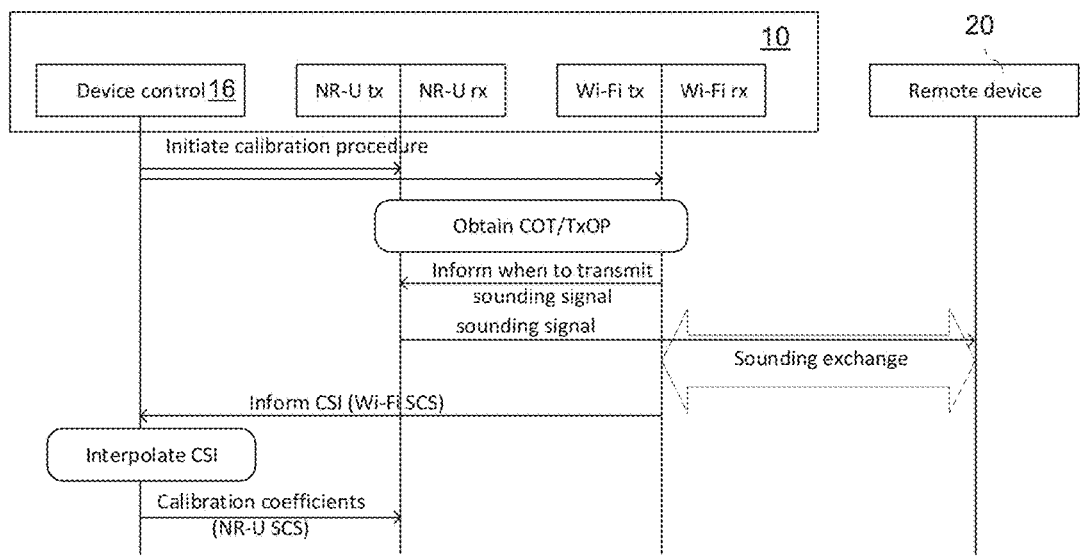
FIG. 4 illustrates information flows and events in a multi-RAT device in accordance with at least some embodiments.
Figure 5:
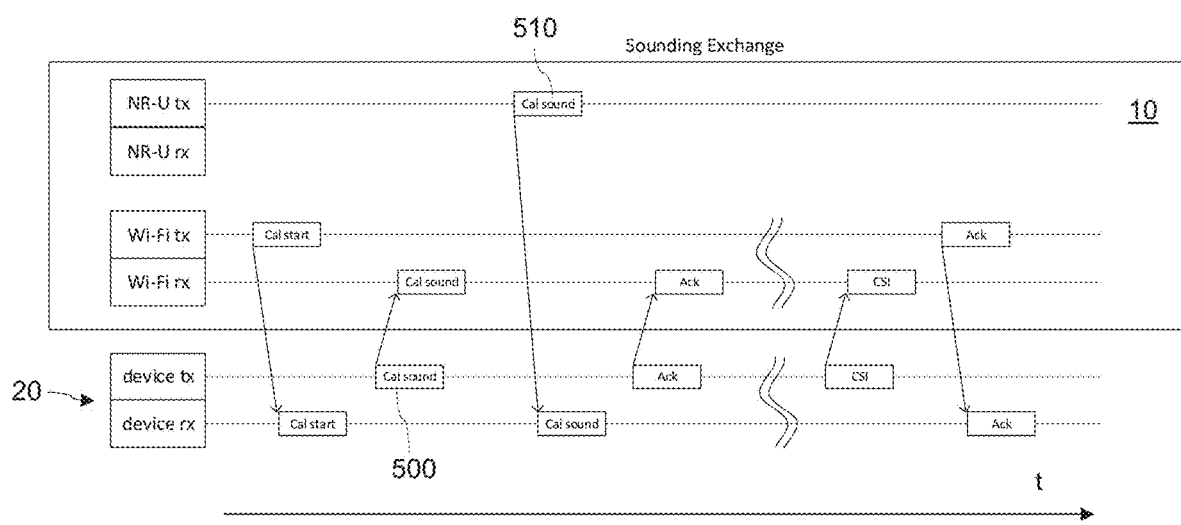
FIG. 5 illustrates a signalling example in accordance with at least some embodiments.

FIGS. 4 and 5 illustrate multi-RAT sounding procedure and signalling examples for implicit feedback beamforming. In these examples the device A 10 comprises a (radio) device controller (or manager) 16, NR-U transceiver (NR-U tx/rx), and Wi-Fi IEEE 802.11 based transceiver (Wi-Fi tx/rx; the respective transceivers being below referred to as radios). The device 10 operates as a beamformer device and may perform the method of FIG. 2.

The calibration procedure is initiated by the device controller 16. The device controller 16 may inform the start of the calibration procedure to the Wi-Fi radio and also to the NR-U radio.

If a (shareable) channel occupancy time (COT) is not yet available, the Wi-Fi or NR-U radio contents for a TxOP. The Wi-Fi radio carries out the sounding handshake procedure with a remote device, such as the device B 20 (or 2nd device referred to in FIG. 2). The radio may inform the NR-U radio of the transmission time for the sounding signal. This timing information may become available either when the COT has been obtained, or after the first reply by the device B 20.

The NR-U radio transmits the sounding signal (i.e. the calibration message in the method of FIG. 2) to the device B 20 at the specified transmission time as part of the sounding exchange with the device B 20. The sounding signal may have been provided by the Wi-Fi radio as an arbitrary or predefined waveform, the NR-U radio (baseband) has pre-stored the relevant sequence, or the NR-U radio has computed the relevant sequence using parameters from the Wi-Fi radio or the device controller 16. As the NR-U transmitter may have different sampling rate than the Wi-Fi radio, the waveform may be time-interpolated (resampled) to match the NR-U sampling rate.

The CSI received from the device B 20, such as channel estimates of the Wi-Fi rx and remote device rx, are sent to a processor. The processor can be located in or in connection with the NR-U radio, the Wi-FI radio, the device controller 16 (as in FIG. 4), or somewhere else in the device 10. The processor computes the calibration coefficients, and also interpolates the coefficients (or the received CSI) for the SCS that is in use at the NR-U radio (NR-U SCS). In the example of FIG. 4, the calibration coefficients of the NR-U SCS are sent to the NR-U radio, which may then take them into use for null-steering.

FIG. 5 further illustrates an example of the sounding exchange procedure between the device 10 and the remote device B 20, in case of implicit feedback beamforming. The signals are illustrated as they may appear on the devices' receiver and transmitter.

The calibration start message of FIG. 2 may be a calibration start (Cal start in FIG. 5) frame. As further illustrated in FIG. 5, before transmitting the calibration sounding signal 510 (as the calibration message of FIG. 2) by the NR-U radio, a preceding (or first) sounding signal (or calibration message) 500 may be transmitted via the Wi-FI radio from the device B 20.

The calibration sounding signal (Cal sound) 510 sent by the 2nd transceiver, in the example by the NR-U transmitter, may be a calibration sounding (response) frame or a calibration sounding complete frame.

For example, the calibration start message and the calibration sounding (response/complete) frame may comprise a calibration position sub-field (which may be e.g. for the calibration sounding complete frame set to 3). The calibration start message and the calibration sounding frame may also comprise may comprise a CSI steering subfield (set to (e.g. one) to that NDP will follow).

FIG. 5 further illustrates acknowledgement (Ack) of the calibration message, and subsequent CSI transmission (CSI) via the Wi-FI radio and acknowledgement thereof.

Figure 6:
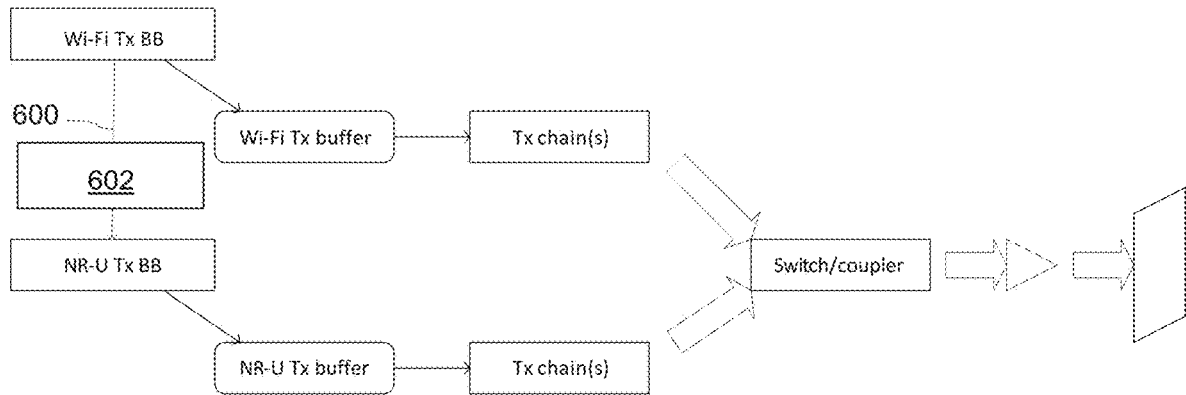
FIG. 6 illustrates a transmission architecture example.

FIG. 6 illustrates an example transmission architecture which may be applied for the examples of FIGS. 4 and 5, for example. Interface 600 may be configured between the Wi-Fi Tx baseband (BB) and the NR-U Tx BB for supporting at least some of the presently disclosed multi-RAT sounding features. For example, the timing information and the sounding waveform (and/or other information) for the sounding frame may be provided by the Wi-Fi via the interface. There may be one or more intermediate units 602, such as an intermediate buffer.

Explicit Feedback Sounding Procedure Example

Figure 7:
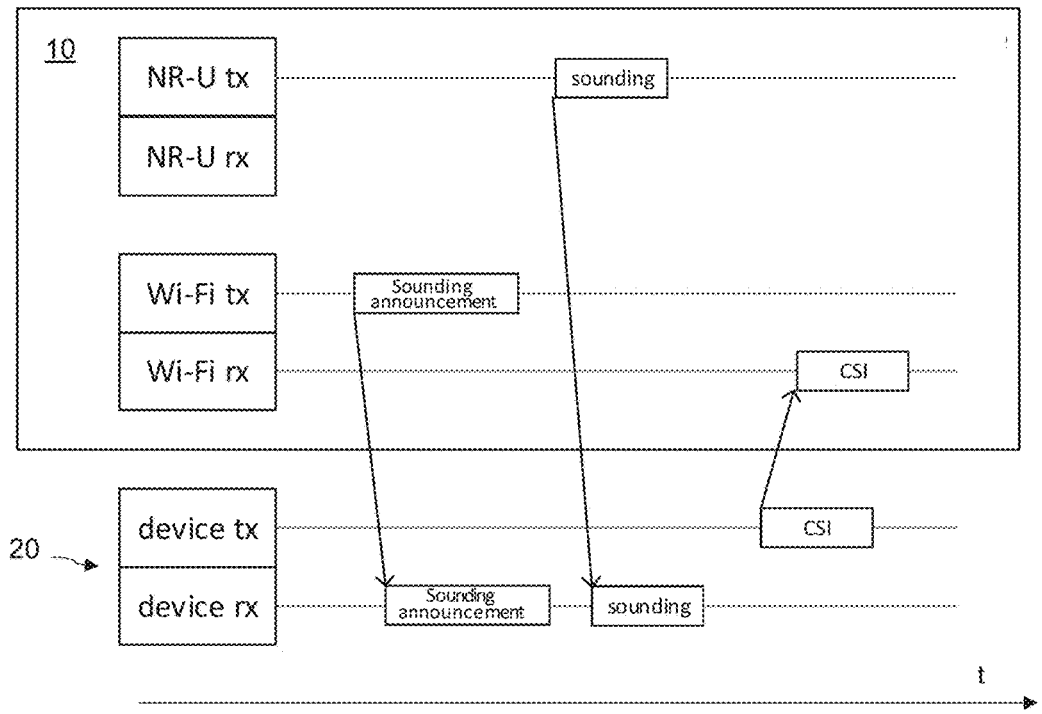
FIG. 7 illustrates a signalling example in accordance with at least some embodiments.

FIG. 7 illustrates multi-RAT sounding procedure and signalling example for explicit feedback beamforming, for the device A 10 operating as a beamformer and performing the method of FIG. 2. Instead of a calibration procedure carried out once, a sounding exchange may be carried out before each (or most) transmissions, and the feedback is provided by the device within channel coherence time.

In this example, the calibration start message transmitted by the Wi-Fi transceiver is a sounding or NDP announcement frame (Sounding announcement). The sounding signal (as the calibration message of FIG. 2) is transmitted by the NR-U radio in response to transmitting the announcement frame. In an example embodiment, an NDP frame is thus transmitted in response to the NDP announcement frame. For example, the NDP frame may comprise information on number of space time streams and signal length. The NDP announcement frame may comprise a STA info field indicative of STA expected to process following NDP and prepare the sounding feedback and feedback type field, for example.

The beamformee device B 20 may comprise a Wi-Fi transceiver which is configured to measure the sounding signal (sounding) transmitted by the NR-U transmitter. The CSI is sent by the Wi-Fi transceiver of the device B 20 and received by the Wi-Fi receiver of the device A 10. In an embodiment, the device B 20 may respond with compressed beamforming frame (comprising the CSI of FIG. 7).

Similarly as explained in connection with FIG. 5, the CSI is provided to a processor. Computed calibration coefficients may then be used for null-steering and beamforming. For example, calibration coefficients interpolated for the NR-U SCS may be provided to the NR-U radio which may perform null-steering to the device B 20.

Example Embodiments for Beamformee Device

Figure 8:
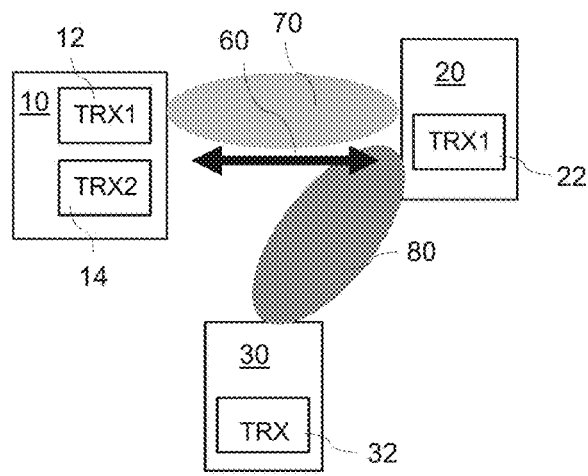
FIG. 8 illustrates a communications example for a multi-RAT device being null-steered.

FIG. 8 illustrates an example for multi-RAT sounding procedure, wherein the 2nd device B 20 is operating as the beamformer. The 1st device A 10 may be operating as a beamformee, e.g. being null-steered 70 by the 2nd device, and perform the method of FIG. 3. In the below example embodiments, the transceivers 12 and 22 are Wi-Fi transceivers and the transceiver 14 is a NR-U transceiver.

In some embodiments, the method of FIG. 3 further comprises receiving the calibration message also by the 1st transceiver. The 2nd transceiver is informed of the timing information and further detected signal parameters on the basis of the calibration message received by the 1st transceiver. The 2nd transceiver is configured to receive 320 the calibration message on the basis of the timing information and further signal parameters (e.g. frequency offset) from the 1st transceiver.

Figure 9:
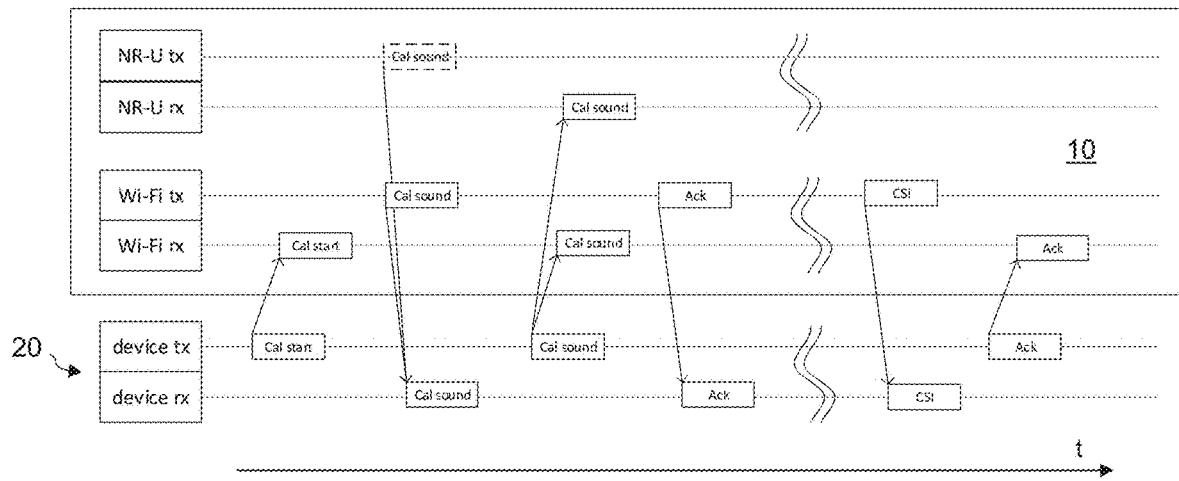
FIG. 9 illustrates a signalling example in accordance with at least some embodiments.

With reference to the implicit feedback sounding example of FIG. 9, the procedure is initiated by the calibration start message by the device B 20, who has also obtained the MCOT. The calibration start message is received by the Wi-Fi radio of the device A 10.

The device A 10 sends the first (calibration) sounding signal (Cal Sound which may be transmitted by:
 the node's Wi-Fi transmitter, if also later on the Wi-Fi tx will be used for sounding/preamble transmissions, or
 the node's NR-U transmitter, if also later on the NR-U tx will be used for sounding/preamble transmissions. In this embodiment, the Wi-Fi radio (or device controller) of device A 10 informs the NR-U radio about the time when to send the sounding signal, and the NR-U radio is configured to transmit the first calibration sounding frame on the informed time.

The device B 20 sends a second (calibration) sounding signal, which may be received by the Wi-Fi and NR-U receivers of the device A 10 (block 320 of the method in FIG. 3). The Wi-Fi radio may inform the NR-U radio about the timing and possible other signal parameters of the UL sounding signal once it has found it. This enables the NR-U rx BB to process the Wi-Fi sounding signal without having to separately perform synchronization based on a Wi-Fi signal (it is presupposed that the rx chains can access the antenna signal in parallel).

Here it is assumed that the Wi-Fi and NR-U receivers in the device A 10 do not have a known calibration difference. If their calibration relation is known, the Wi-Fi rx receiving the sounding signal may simply add the difference to its channel estimate before providing the estimate to the device B 20.

After Ack, the CSI is generated on the basis of the sounding signal as received by the NR-U rx. The channel estimate by the NR-U rx is interpolated to the SCS for Wi-Fi transmission (e.g. in case of IEEE 802.11ac 312 kHz or in case of 802.11ax 78 kHz) and then transmitted as the CSI to the device B 20 by the Wi-Fi transmitter.

Figure 10:
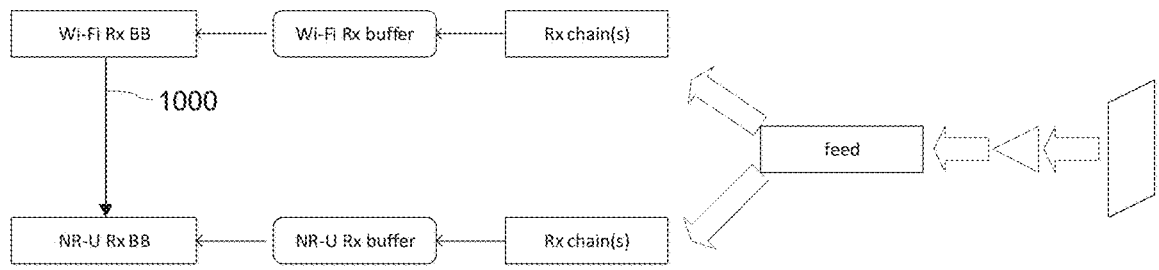
FIG. 10 illustrates a reception architecture example.

FIG. 10 illustrates an example reception architecture, which may be applied in connection with the embodiment of FIG. 9, for example. In the example, antenna signal becomes available substantially simultaneously to both rx chains. Information on calibration sounding frame timing and frequency offset, for example, may be provided to the NR-U BB via the interface 1000, to enable the NR-U rx to receive the sounding signal from the Wi-Fi transmitted of the device B 20.

Figure 11:
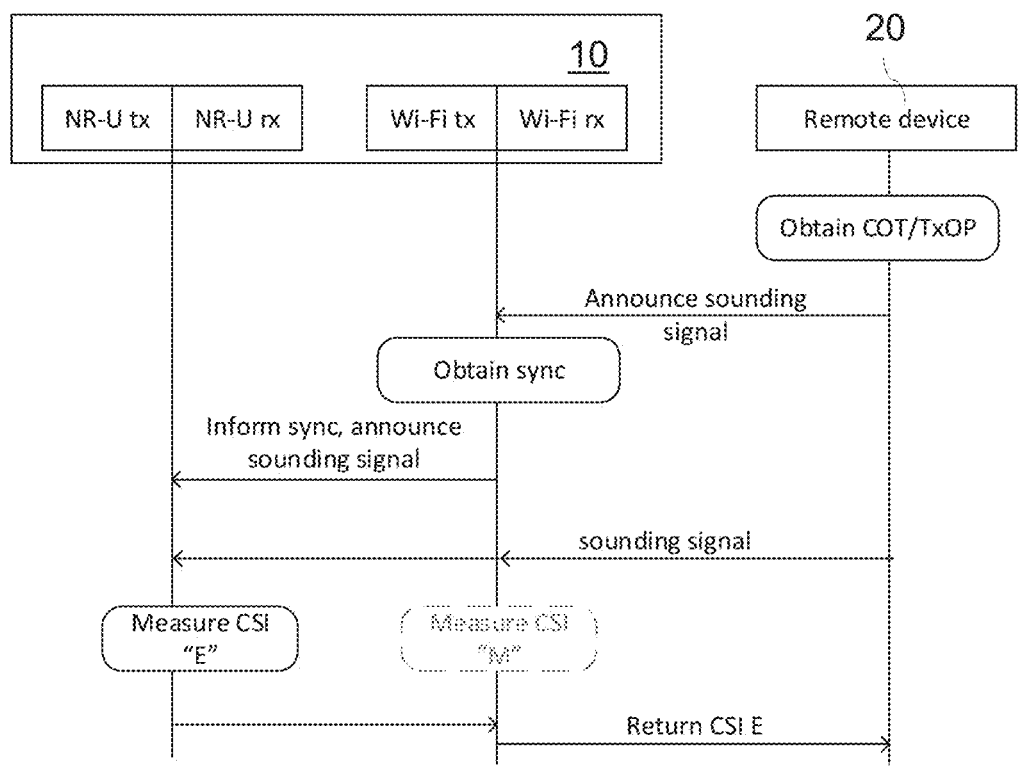
FIG. 11 illustrates a signalling example in accordance with at least some embodiments.

FIG. 11 illustrates an example of explicit inter-RAT sounding procedure for the beamformee device A 10. The remote device B 20, after obtaining a COT/TxOP for its Wi-Fi transmitter, sends a sounding announcement, which is received by the Wi-Fi rx of the device A 10.

If the device A's receivers' phase- and amplitude-differences D are not known, following procedure may be applied: The device B 20 sends a sounding signal as part of an explicit sounding feedback exchange. Both the Wi-Fi rx and the NR-U rx receive the sounding signal and measure the channel, "E" and "M", respectively. To enable this, after obtaining sync, the Wi-Fi radio may inform (Inform sync, announce sounding signal) the NR-U radio about the exact timing and other signal parameters of the announced sounding signal once detected based on the sounding signal announcement or the sounding signal itself. This enables the NR-U BB to process the Wi-Fi sounding signal from the device B 20 without having to separately perform synchronization based on a Wi-Fi signal (it is again supposed that the rx chains can access the antenna signal in parallel).

The device A 10 computes the CSI that is going to be provided to the remote device B 20. The CSI will be based on the channel estimate as seen by the NR-U receiver ("E"), however interpolated to the expected (Wi-Fi radio) SCS of the device B 20. The Wi-Fi tx transmits the CSI to the device B 20.

The sounding protocol is thus carried out via the Wi-Fi interface, however the channel estimation is carried out via the NR-U rx chains, so as to obtain the channel estimate as seen by the NR-U receiver for facilitating improved spatial reuse.

Example Embodiments for Further Control Signalling and CSI Generation

According to an aspect, an apparatus, such as the beamformee 2nd device (B 20) in the embodiments of FIGS. 1a-c and 2 and in the below example embodiments, comprising a transceiver of the first RAT and receiving a calibration message, e.g. the calibration message transmitted by the 2nd transceiver of the 1st device in 220, is configured to further process a channel estimate based on the calibration message before transmitting the CSI. This may be performed to enable the CSI be more readily used in the (beamformer) 1st device (e.g. device A 10) for determining (240) coefficients for transmission by the second RAT. The beamformee device may thus further assist in the inter/cross-RAT based channel estimation.

The beamformee device (e.g. device B 20) may thus be configured to interpolate a channel estimate generated on the basis of the received calibration message, and transmit the interpolated channel estimate as the CSI to the device A (received in 230). Thus, the interpolation disclosed e.g. in connection with FIG. 4 may be avoided due to the interpolation carried out by the device B 20.

The device A 10 may be configured to generate (interpolation) control information and send it to the device B 20, which is configured to control the interpolation on the basis of the interpolation control information.

In some embodiments, instead of, or in addition to, performing interpolation, the device B 20 may be configured to select subcarriers closest to the subcarrier spacing informed by the device A 10.

The control information may comprise one or more of an interpolation request, indication of length of the calibration signal, and indication of subcarrier resolution (and/or other reporting parameters) for reporting the channel state information to the first device, for example. The control information is included in the calibration/sounding procedure messages. In an embodiment, control information is included in the calibration start message (block 210), such an announcement frame. At least some of these features regarding provision and application of the control information may be applied as additional features in connection with the embodiments associated with FIG. 2, or as independent method(s). Some further example embodiments, with references to IEEE802.11 based sounding protocol, are illustrated below.

The device A 10 may be configured to transmit parameters for sounding signal length and report resolution in the announcement frame (or by other configuration), in order to allow inter-RAT sounding.

The inter-RAT calibration message, or sounding signal transmitted by the (2nd transceiver of the) device A 10 may be preconfigured or selected such that it can be easily processed by the receiving device B 20. For example, the signal may have time duration, which is an integer multiple of a sounding signal otherwise processed by receiver of the device B. In this embodiment sounding length and report resolution may not be based on the same clock.

Figure 12:
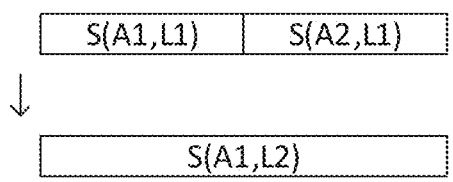
FIG. 12 illustrates reusing of sounding signal fields.

The sounding signal may take the format of a MIMO sounding signal, where the device A 10 may be configured to transmit the sounding signal of a single antenna using the space in the sounding signal designated for two, or four antennas, for example. This is illustrated in FIG. 12, where originally the device B 20 would have processed sounding signals of length L1 (of antennas A1 and A2), it is configured to process a sounding signal of length L2.

Such reusing of sounding signal fields by combining space of sounding signals for two antennas enables to have a longer sounding signal for single antenna. The longer sounding signal being a multiple of other sounding signals can be more easily processed. The device B 20 may interpret the sounding signal sent over a single antenna by the transmitter as a single symbol. For instance, if the VHT sounding signal (original SCS 312.5 kHz) was sent for a duration of 4× normal symbol length, the receiver will interpret the symbol as having a 312.5/4=78.125 kHz spacing. In another example, if the HE sounding signal (original SCS 78 kHz) was sent for a duration of 4× normal symbol length the receiver will interpret the symbol as having a 78/4=19.5 kHz spacing.

For example, if the device B 20 has detected, on the basis of the control information received e.g. in the announcement frame, the sounding signal with a 19.5 kHz spacing, and the device A 10 has further indicated in the announcement frame that the SCS resolution should be 30 kHz, the device B 20 may choose from the channel estimates [1 . . . M]*19.5 the subcarriers closest to [1 . . . N]*30.

The announcement frame may contain also an interpolation request, in response to which the device B 20 may be configured to perform the interpolation (for the CSI to the device A 10), e.g. to [1 . . . N]*30.

Hence, at least some of the control information below may be transmitted from the first device to the second device for controlling sounding signal reception and/or further processing:
1) sounding signal length; per antenna/space time stream (STS)/SCS of sounding signal
2) number of antennas
3) SCS spacing of CSI report
4) interpolation flag For example, the 1) sounding signal length may be signalled as a multiple of a baseline length, and 2 bits may be sufficient. It may be also signalled as an index into a table. In further embodiments, the signal is not restricted to be a multiple of a base sounding signal.

The 2) number of antennas may be signalled in the announcement frame, or included in the NDP frame.

The 3) SCS spacing of the CSI report may be signalled as
a. a multiple of 3gpp specific SCS spacings, and 2-3 bits may be sufficient. Additionally, the "grouping" of subcarriers as exists already in current Wi-Fi reports may be used. Alternatively, it may be encoded as
b. a fractional integer.

The 4) interpolation request may be signalled as a single bit. It would govern whether nearest subcarrier on the Wi-Fi SCS grid is being reported, or the interpolated subcarrier on the signaled SCS grid.

In an example embodiment, STA info subfield of an NDP announcement frame is applied to carry at least some of the control information, such as the information of the sounding sequence length. Alternatively a new information element is defined for the control information in the announcement frame. For example, new frame control may be defined for allowing for new IEs or rather different STA Info IEs, carrying some or all of the control information as described above.

In another embodiment, a special association identifier (e.g. AID11) may be defined, which may be used to indicate cross-RAT and re-interpret the partial BW to carry actual sounding length factor, and desired SCS for the CSI report, for example.

If the length of the sounding signal is signalled in the announcement frame and the amount of antennas in the NDP frame, the device B 20 needs to infer the length of the NDP frame accordingly.

In an example, the device A 10 may signal in an announcement frame:
1. symbol length=4*HE-LTF+no subcarrier grouping;
2. antennas=6;
3. 30 kHz SCS;
4. no interpolation.

It is assumed that the selected bandwidth is 20 MHz. The device A then sends the NDP frame (as calibration message), with the total length of the HE-LTF fields is 4*HE-LTF*6. The receiver of the device B 20 interprets the NDP HE-LTF fields as containing 6 symbols, of length 4*HE-LTF (leading to an SCS of 78/4=19.5 kHz). The receiver may be configured to provide channel estimates of subcarriers on the 19.5 kHz grid which are closest to the 30 kHz grid.

Instead of, or in addition to, transmitting the control information in the calibration start message, such as in the announcement frame about the format of the sounding signal, at least some of the control information may thus be included in the calibration message, such as the NDP frame (or calibration sounding response or complete frame in case of implicit fb bf).

For example, if the NDP frame is applied for signaling, at least some of the control information may be included in the VHT-LTF (in case of VHT NDP PPDU) or HE-LTF (for HE NDP PDPU) field. In one further example embodiment for the HE NDP frame, one or more of the HE-SIG-A bit B9 "STBC", B8-13 "BSS color", and B15-18 "spatial reuse" elements are applied or re-used for the control information signalling, such as to indicate the amount and length IE-LTF for sounding.

Above-illustrated further control information scheme allows a finer SCS granularity of the channel reports for inter-RAT null steering. Achievable channel estimate accuracy may be balanced with the amount of standard and implementation changes required for Wi-Fi.

The 1st wireless device 10 illustrated in above example embodiments may be an access node of a 1st wireless network and the 2nd wireless device 20 may be configured to operate as a station of a 2nd wireless network, different from the 1st wireless network. The access node may be or comprise an access point.

In some embodiments, the 1st device A 10 is (or is configured to operate as) a gNodeB (gNB) comprising an NR-U transceiver, and a Wi-Fi AP. The Wi-Fi AP is configured for explicit and/or implicit feedback beamforming procedure with a AP or (non-AP) STA by applying sounding signal transmission by and/or channel estimate received by the NR-U transceiver.

Above illustrated example embodiments enable the 1st device, such as a gNB node or other type of network node, to interact with the 2nd device such that the $1^{st}$ device may reduce its interference towards the 2nd device, or vice versa. Various scenarios of coexistence are facilitated, for example, wherein a gNB is neighbour to a Wi-Fi AP. The Wi-Fi AP (part of the device) may perform null-steering towards a cellular user equipment (UE), and the gNB (part of the device) may perform null-steering towards a STA, for example. The null-steering transmissions by the gNB and AP may happen at the same. The methods enable benefits also for relay-type network nodes. For example, Third Generation Partnership Project (3GPP) integrated access backhaul (IAB) relays, and Wi-Fi relays/bridges may be configured to apply at least some of the above-illustrated embodiments.

In a further embodiment, the 1st and/or the 2nd wireless network is 802.11ax based WLAN. In case of 802.11ax based RAT, above-illustrated calibration/sounding messages may be High Efficiency (HE) NDP frames.

In some embodiments, the wireless devices are Extremely High Throughput (EHT) devices. EHT is currently discussed in an IEEE 802.11 EHT topic interest group (TIG) to initiate discussions on new 802.11 features for bands between 1 and 7.125 GHz. The EHT's primary objective is to increase peak throughput and cell efficiency as well as to reduce latency to support high throughput and low latency applications, such as video-over-WLAN, augmented reality (AR) and virtual reality (VR). Such EHT devices may apply more spatial streams, increased bandwidth, and multiband switching, aggregation and operation.

While some embodiments have been described in the context of WLAN/IEEE 802.11 and 5G NR-U based systems, it should be appreciated that these or other embodiments of the invention may be applicable in connection with other technologies configured to operate on licensed or non-licensed band, such as with wireless devices operating according to other local-connectivity technologies, other existing or future versions of the IEEE 802.11, 6G cellular systems, or other existing or future technologies facilitating spatial reuse.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a base station, an access point or node device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 13:
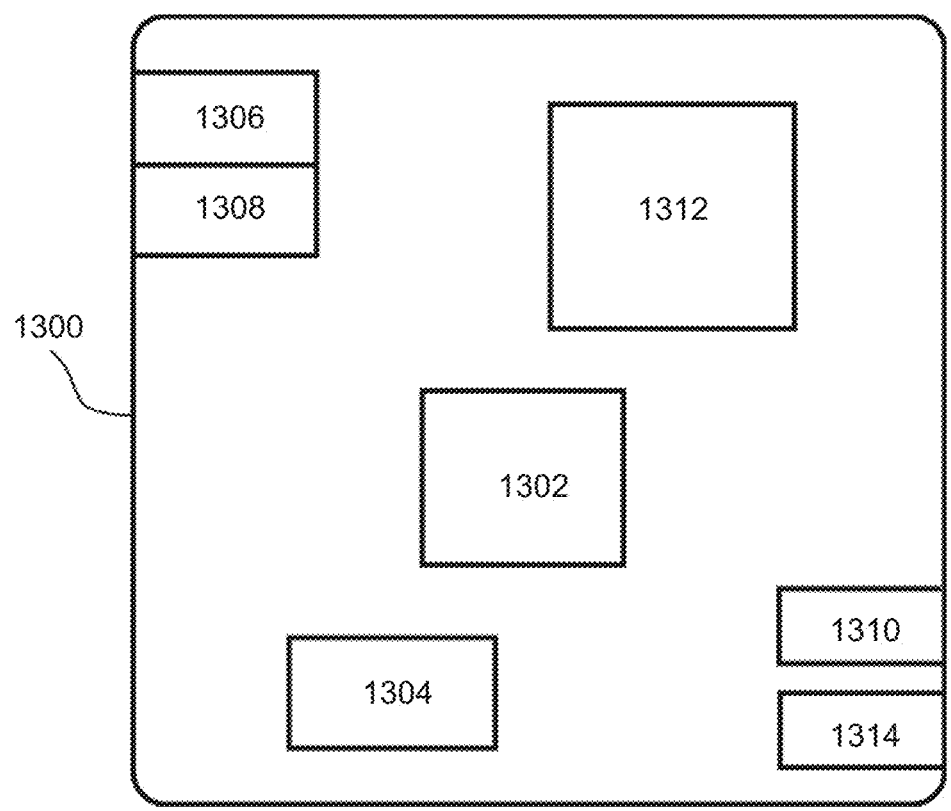
FIG. 13 illustrates an example apparatus capable of supporting at least some embodiments.

FIG. 13 illustrates an example apparatus capable of supporting at least some embodiments of the present invention. Illustrated is a device 1300, which may comprise a communications device arranged to operate as the 1st device or device A 10, for example. The device may include one or more controllers configured to carry out operations in accordance with at least some of the embodiments illustrated above, such as some or more of the features illustrated above in connection with FIGS. 2 to 12. The device may be configured to operate as the apparatus configured to carry out the method of FIG. 2 and/or 3, for example.

Comprised in the device 1300 is a processor 1302, which may comprise, for example, a single- or multi-core processor wherein a single-core processor comprises one processing core and a multi-core processor comprises more than one processing core. The processor 1302 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 1300 may comprise memory 1304. The memory may comprise random-access memory and/or permanent memory. The memory may comprise at least one RAM chip. The memory may comprise solid-state, magnetic, optical and/or holographic memory, for example. The memory may be at least in part accessible to the processor 1302. The memory may be at least in part comprised in the processor 1302. The memory 1304 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 1300 but accessible to the device. For example, control parameters affecting operations related to the multi-RAT calibration/sounding procedure for beamforming and null steering may be stored in one or more portions of the memory and used to control operation of the apparatus. Further, the memory may comprise device-specific cryptographic information, such as secret and public key of the device 1300.

The device 1300 may comprise a 1st transceiver 1306 of the 1st RAT. The device may comprise a 2nd transceiver 1308 of the 2nd RAT. The transceiver 1306, 1308 may be configured to operate in accordance with a wireless, cellular or non-cellular standard, such as wideband code division multiple access, WCDMA, long term evolution, LTE, 5G or other cellular communications systems, and/or a WLAN standard, for example. The device 1300 may comprise a near-field communication, NFC, transceiver 1310. The NFC transceiver may support at least one NFC technology, such as NFC, Bluetooth, Wibree or similar technologies.

The device 1300 may comprise user interface, UI, 1312. The UI may comprise at least one of a display, a keyboard, a touchscreen, a vibrator arranged to signal to a user by causing the device to vibrate, a speaker and a microphone. A user may be able to operate the device via the UI, for example to configure or control the device.

The device 1300 may comprise or be arranged to accept a user identity module or other type of memory module 1314. The user identity module may comprise, for example, a subscriber identity module, SIM, and/or a personal identification IC card installable in the device 1300. The user identity module 1314 may comprise information identifying a subscription of a user of device 1300. The user identity module 1314 may comprise cryptographic information usable to verify the identity of a user of device 1300 and/or to facilitate encryption and decryption of communication effected via the device 1300.

The processor 1302 may be furnished with a transmitter arranged to output information from the processor, via electrical leads internal to the device 1300, to other devices comprised in the device. Such a transmitter may comprise a serial bus transmitter arranged to, for example, output information via at least one electrical lead to memory 1304 for storage therein. Alternatively to a serial bus, the transmitter may comprise a parallel bus transmitter. Likewise the processor may comprise a receiver arranged to receive information in the processor, via electrical leads internal to the device 1300, from other devices comprised in the device 1300. Such a receiver may comprise a serial bus receiver arranged to, for example, receive information via at least one electrical lead from the transceiver 1306, 1308 for processing in the processor. Alternatively to a serial bus, the receiver may comprise a parallel bus receiver.

The device 1300 may comprise further devices not illustrated in FIG. 13. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 1310 and/or the user identity module 1314.

The processor 1302, the memory 1304, the transceiver 1306, 1308, the NFC transceiver 1310, the UI 1312 and/or the user identity module 1314 may be interconnected by electrical leads internal to the device 1300 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising:
   at least one processor; and
   at least one memory including instructions,
   wherein the at least one memory and the instructions are configured, with the at least one processor, to cause the apparatus to:
   transmit, by a first transceiver configured to operate according to a first radio access technology, wherein the apparatus comprises the first transceiver, a calibration start message to a second device to start a calibration process for a second radio access technology by the second device, wherein the first and second radio access technologies are different,
   transmit a calibration message by a second transceiver, configured to operate according to the second radio access technology, to the second device, wherein the apparatus comprises the second transceiver,
   receive by the first transceiver, channel state information for the second transceiver from the second device, wherein the channel state information is based on reception of the calibration message,
   determine at least one coefficient for null steering towards the second device based on the channel state information; and
   perform null steering for transmissions by the second transceiver towards the second device based on the at least one coefficient.

2. The apparatus of claim 1, wherein the at least one memory and the instructions are configured, with the at least one processor, to cause the apparatus to:
   interpolate the channel state information for subcarrier spacing for the second transceiver, and
   provide the interpolated channel state information for the second transceiver.

3. The apparatus of claim 1, wherein the at least one memory and the instructions are configured, with the at least one processor, to cause the apparatus to: transmit, by the first transceiver, interpolation control information to the second device, for controlling interpolation of channel estimate generated on the basis of the calibration message.

4. The apparatus of claim 1, wherein the at least one memory and the instructions are configured, with the at least one processor, to cause the apparatus to: determine a transmission time for the calibration message and transmit the calibration message in response to the determined transmission time occurring.

5. The apparatus of claim 1, wherein the at least one memory and the instructions are configured, with the at least one processor, to cause the apparatus to generate the calibration message by the second transceiver using at least one of: a waveform provided by the first transceiver, a prestored sequence accessed by the second transceiver, or a sequence generated by the second transceiver on the basis of input parameters from the first transceiver or a device controller.

6. The apparatus of claim 1, wherein the channel state information comprises subcarrier channel estimate information, channel quality information, or beamforming coefficient information.

7. The apparatus of claim 1, wherein the calibration start message is a calibration start frame for implicit feedback beamforming or an announcement for explicit feedback beamforming, and the calibration message is a calibration sounding complete frame or a null data packet frame transmitted in response to the calibration start message.

8. The apparatus of claim 1, wherein the first transceiver is a wireless local area network transceiver and the second transceiver is new radio-unlicensed transceiver.

9. An apparatus, comprising:
   at least one processor; and
   at least one memory including instructions,
   wherein the at least one memory and the instructions are configured, with the at least one processor, to cause the apparatus to:
   receive, by a first transceiver of a first radio access technology and from a second device, wherein the apparatus comprises the first transceiver, a calibration start message to start a calibration process for a second radio access technology,
   based on receiving the calibration start message on the first transceiver of the first radio access technology, receive, by a second transceiver configured to operate according to the second radio access technology, wherein the apparatus comprises the second transceiver, a calibration message from the second device, wherein the first and second radio access technologies are different,
   generate channel state information for the second transceiver on the basis of the received calibration message, and
   transmit, by the first transceiver, the channel state information to the second device for performing null steering by the second device toward the apparatus.

10. The apparatus of claim 9, wherein the at least one memory and the instructions are configured, with the at least one processor, to cause the apparatus to:
   determine timing information for the calibration message for the second transceiver, and
   receive the calibration message from the second device on the basis of the determined timing information.

11. The apparatus of claim 9, wherein the at least one memory and the instructions are configured, with the at least one processor, to cause the apparatus to:
   interpolate channel estimate by the second transceiver on the basis of the received calibration message to subcarrier spacing of the first transceiver, and
   transmit the interpolated channel estimate from the first transceiver as the channel state information.

12. The apparatus of claim 9, wherein the channel state information comprises subcarrier channel estimate information, channel quality information, or beamforming coefficient information.

13. A method performed by a first device, comprising:
   transmitting, by a first transceiver configured to operate according to a first radio access technology, wherein the first device comprises the first transceiver, a calibration start message to a second device to start a calibration process for a second radio access technology by the second device,
   transmitting a calibration message by a second transceiver, configured to operate according to the second radio access technology, to the second device, wherein the first device comprises the second transceiver, wherein the first and second radio access technologies are different,
   receiving channel state information for the second transceiver, the receiving by the first transceiver from the second device, wherein the channel state information is based on reception of the calibration message,
   determine at least one coefficient for null steering towards the second device based on the channel state information; and
   perform null steering for transmissions by the second transceiver towards the second device based on the at least one coefficient.

14. The method of claim 13, further comprising: interpolating, by the first device, the channel state information for subcarrier spacing for the second transceiver, and providing, by the first device, the interpolated channel state information for the second transceiver.

15. The method of claim 13, further comprising:
   transmitting, by the first transceiver, interpolation control information from the first device to the second device, for controlling interpolation of channel estimate generated on the basis of the calibration message.

16. The method of claim 13, further comprising:
   determining, by the first device, a transmission time for the calibration message and transmitting the calibration message in response to the determined transmission time occurring.

17. The method of claim 13, further comprising:
   generating the calibration message by the second transceiver using at least one of: a waveform provided by the first transceiver, a prestored sequence accessed by the second transceiver, or a sequence generated by the second transceiver on the basis of input parameters from the first transceiver or a device controller.

18. The method of claim 13, wherein the channel state information comprises subcarrier channel estimate information, channel quality information, or beamforming coefficient information.

19. The method of claim 13, wherein the calibration start message is a calibration start frame for implicit feedback beamforming or an announcement for explicit feedback beamforming, and the calibration message is a calibration sounding complete frame or a null data packet frame transmitted in response to the calibration start message.

20. The method of claim 13, wherein the first transceiver is a wireless local area network transceiver and the second transceiver is new radio-unlicensed transceiver.

* * * * *